No. 719,024. PATENTED JAN. 27, 1903.
W. M. MORDEY.
ALTERNATE CURRENT TRACTION SYSTEM.
APPLICATION FILED NOV. 14, 1902.
NO MODEL. 2 SHEETS—SHEET 2.
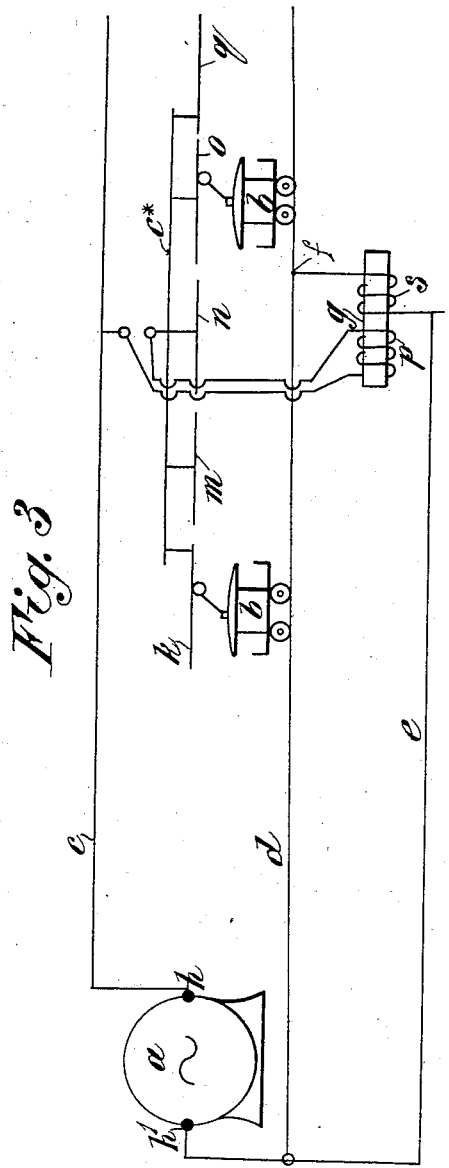
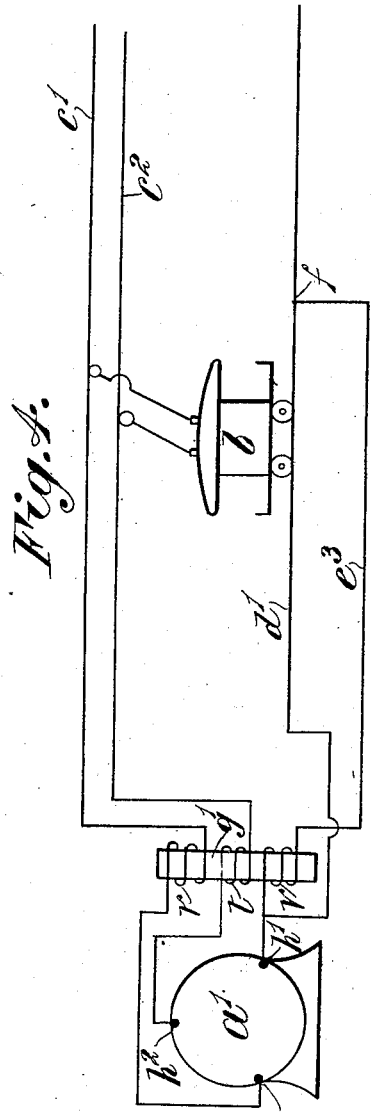
Witnesses
Inventor
William Morris Mordey
By
Attorneys

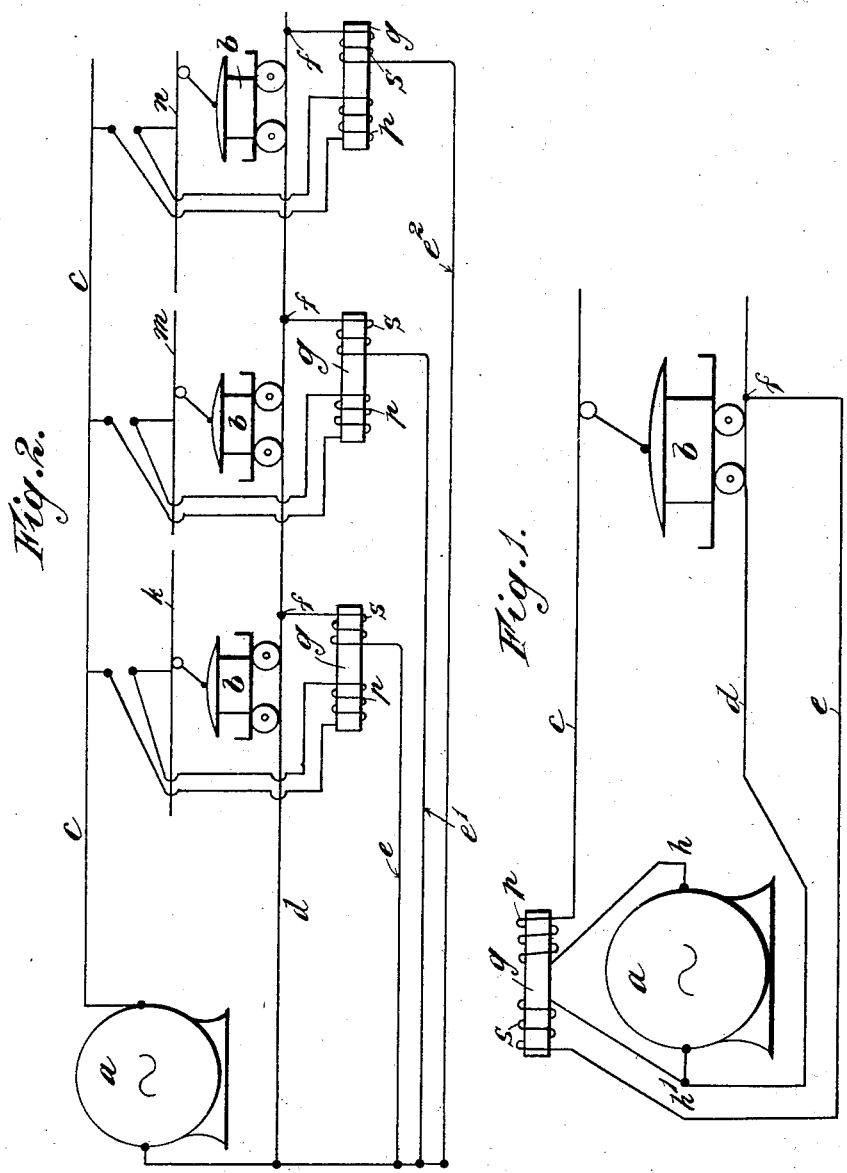

UNITED STATES PATENT OFFICE.

WILLIAM MORRIS MORDEY, OF WESTMINSTER, LONDON, ENGLAND.

ALTERNATE-CURRENT TRACTION SYSTEM.

SPECIFICATION forming part of Letters Patent No. 719,024, dated January 27, 1903.

Application filed November 14, 1902. Serial No. 131,300. (No model.)

*To all whom it may concern:*

Be it known that I, WILLIAM MORRIS MORDEY, a subject of the King of Great Britain and Ireland, residing at Westminster, in the county of London, England, have invented Improvements in or Relating to Alternate-Current Traction Systems, of which the following is a specification.

This invention has for its object improved means for diverting the return-current of alternate-current railway or tramway lines from the return rail or conductor into return feeder-conductors, thus reducing or avoiding fall of pressure in the return-circuit. For this purpose the current in the outgoing conductor is passed through a winding of a transformer, the return-current passing in the opposite direction through another winding on the said transformer. By this means fall of pressure in the return main or feeder is reduced without practically affecting the pressure of the motors or of the circuit as a whole. The transformer may be placed at the generating or transforming station or at any convenient point on the line. By suitably arranging the windings any desired transfer of pressure to the return-circuit may be obtained.

The invention is applicable to single or multiphase systems of electric railways or tramways.

In the accompanying illustrative drawings, Figures 1, 2, and 3 show diagrammatically different ways of applying the invention to a single-phase electric railway or tramway, Fig. 1 showing an arrangement suitable for short lines and Figs. 2 and 3 arrangements suitable for long lines. Fig. 4 shows diagrammatically how the invention can be applied to a three-phase electric railway or tramway.

Referring to Fig. 1, $a$ is a single-phase alternator supplying alternate current to a car or train $b$, or it may be to two or more cars or trains. The outgoing current is conveyed by a trolley-line or other insulated conductor $c$, from which it passes to the car or train $b$, on which it passes through the motor or motors used for propelling purposes or through static or rotary converters or motor-generators or other apparatus in which the alternate current is utilized or transformed, the current then passing to the return-conductor $d$, which may be the uninsulated rails or any other conductor wholly or partly insulated.

$e$ is an insulated return-feeder led from a point $f$ of the return-rail or other conductor $d$ back to the alternator $a$.

$g$ is a transformer having a laminated-iron core provided with two windings $p$ and $s$, that are connected up in the circuit in the manner shown, the outgoing current passing from one pole $h$ of the generator $a$ through winding $p$ to the trolley-line $c$, and the current returning to the other terminal $h'$ of the generator $a$, partly by the return-conductor $d$ and partly by the return-feeder $e$ and the winding $s$.

It will be seen that the current traverses the windings $p$ and $s$ in opposite directions and that the current in winding $p$ is larger than that in winding $s$ by the amount which directly returns to terminal $h$ by way of return-conductor $d$. The effect of this arrangement is that the return-current, or a large proportion of the return-current, is withdrawn from the return-conductor $d$ at the point $f$ by reason of the volts impressed on the winding $s$. Thus the difference in pressure between $f$ and $h'$ will be reduced. The assisting electromotive force thus impressed on the return feeder-circuit $e$ by the winding $s$ is transferred from the other end of the circuit, a corresponding back electromotive force being set up in winding $p$. The total pressure of the circuit, and also the pressure applied to the motors or other electric translating devices on the car or train, is not affected by this arrangement except to the small extent due to the loss in the transformer $g$. The effect is only to alter the distribution of the fall of pressure, removing it from the return-circuit, where it is objectionable, to the outgoing circuit, where it is much less objectionable. The amount of this transfer of pressure may be adjusted by suitable construction of the transformer $g$ to reduce the difference of pressure between $f$ and $h'$ to any desired extent.

The arrangement is practically self-regulating—that is to say, the electromotive force added to the return-feeder $e$ by the winding $s$ tends to be proportional to the current.

For long lines the trolley or distributing line may be in several sections, as shown diagrammatically by Fig. 2, where the main outgoing line $c$ is tapped off at intervals to supply the sectional lines $k\ m\ n$, which are connected to the line $c$ through separate transformers $g$, constructed, as in Fig. 1, with two windings $p\ s$, the winding $p$ being inserted between $c$ and $k$, $m$ or $n$, and the winding $s$ being connected in the return feeder-circuit $e$, $e'$, or $e^2$, as shown.

Several sectional lines may be fed through one transformer, as shown in Fig. 3, where there are five sectional trolley-lines $k\ m\ n\ o\ q$, all fed from the main feeder $c$ through the winding $p$, and an auxiliary feeder $c^*$ common to them, the return-conductor $d$ being connected at the point $f$ to the terminal $h'$ of the alternator $a$ through the single winding $s$ and return-feeder $e$.

Fig. 4 shows the application of the invention to a three-phase railway. $a'$ is a three-phase generator. $c'$ and $c^2$ are the two insulated trolley-lines, the third conductor of the three-phase system being the rail $d'$ or other "return-conductor." A transformer $g'$ is used, having three coils $r$, $t$, and $v$. The coil $r$ is in the circuit of the trolley-line $c'$. The coil $t$ is in the circuit of the trolley-line $c^2$, and the coil $v$ is in the return feeder-circuit $e^2$. The trolley-lines $c'$ and $c^2$ are connected to the terminals $h$ and $h^2$, respectively, of the generator $a'$, and the rail or return conductor $d'$ is connected to the "return-terminal" $h'$ of the said generator. The outgoing currents at any moment in lines $c'$ and $c^2$ set up an electromotive force in winding $v$, which diverts the current from the rail $d'$ to the return-feeder $e^3$, and so reduces the difference of potential which would otherwise be set up in rail $d'$.

In order to secure the necessary phase relation between the two or more windings of the transformer which will be affected by the relative inductances of the return-rail $d$ and return-feeder $e$, inductive or non-inductive counterbalancing coils or condensers may be used in connection with one or other of the lines or with one or other of the transformer-windings.

The application of the invention to long multiphase lines where the cars or trains are supplied by a number of sectional distributing-lines need not be specially described, as it is in accordance with what has been said regarding Fig. 2, except as to the number of phases. Transformers may be used for lowering the pressure between the trolley line or lines and the cars or sectional lines. Their use does not affect the principle of the invention.

What I claim is—

1. In an alternate-current electric-traction system, the combination with an alternate-current generator and supply and return conductors of a return feeder-conductor connected to and in parallel with the return-conductor, and separate stationary windings in the supply and return feeder conductors, the said windings being arranged in inductive relation to each other and so that current in the winding connected to a supply-conductor will impress an assisting electromotive force in the winding connected to the return feeder-conductor.

2. In an alternate-current electric-traction system, the combination with an alternate-current generator and supply and return conductors, of a return feeder-conductor connected to and in parallel with the return-conductor and a static transformer having separate windings arranged in the supply and return current conductors as set forth.

3. In an alternate-current electric-traction system, the combination with an alternate-current generator and supply and return conductors, of a return feeder-conductor connected to said generator and to the return-conductor at a point some distance from said generator, and a static transformer having windings arranged in the supply and return feeder conductors.

4. In an alternate-current electric-traction system, the combination with an alternate-current generator and supply and return conductors connected thereto, of an insulated return feeder-conductor, connected in parallel to the return-conductor at points near to and at a distance from said generator, and a static transformer having a winding arranged in circuit with said supply-conductor and also a winding arranged in circuit with said return feeder-conductor.

5. In an alternate-current traction system, the combination with an alternate-current generator, an insulated supply-conductor, and an uninsulated return-rail, of an insulated return feeder-conductor connected to said generator and to said return-conductor at a point some distance from said generator, and a static transformer having separate windings arranged in the supply and return feeder circuits.

6. In an alternate-current electric-traction system, the combination with an alternate-current generator and supply and return conductors, of a plurality of return feeder-conductors connected in parallel to the return-conductor at different points along the length thereof, and a plurality of transformers each having a winding in circuit with a supply-conductor and a winding in circuit with a return feeder-conductor.

Signed at 8 St. Martins Place, Trafalgar Square, London, in the county of London, England, this 3d day of November, 1902.

WILLIAM MORRIS MORDEY.

Witnesses:
ARTHUR NIBLOCK,
WALTER E. ROCHE.